United States Patent Office 3,565,765
Patented Feb. 23, 1971

3,565,765
PREPARATION OF HIGH MALTOSE CONVERSION PRODUCTS
Robert E. Heady, Park Forest, and Frederick C. Armbruster, La Grange, Ill., assignors to CPC International Inc., a corporation of Delaware
No Drawing. Filed Dec. 27, 1966, Ser. No. 604,559
Int. Cl. C12d 13/02
U.S. Cl. 195—31                           11 Claims

ABSTRACT OF THE DISCLOSURE

A process for preparing a high maltose containing starch conversion product by subjecting a partially hydrolyzed starch having a D.E. less than 20 to conversion with a maltogenic enzyme preparation and a pullulanase enzyme preparation to obtain a conversion product having a D.E. of at least 40, a maltose content of at least 50% and yeast fermentables content of at least 80%. The conversion product can be concentrated and refined if desired to produce a non-crystallizing high maltose syrup. The product is particularly useful in food products such as frozen desserts, confections and the like.

---

The present invention relates to an improved process for the conversion of a partially hydrolyzed starch to obtain conversion products of high maltose content. More particularly, the present invention relates to a process for preparing conversion products of high maltose content from a partially hydrolyzed starch utilizing the combined hydrolytic action of maltogenic enzymes and a starch debranching enzyme.

Maltose is a sweet tasting disaccharide whereas dextrose is a sweet monosaccharide. Maltose, like dextrose, is a reducing sugar. Its syrups, like syrups of dextrose, inevitably contain other saccharides. High maltose syrups are valuable for many applications because they exhibit a decreased tendency to crystallize as compared to high dextrose corn syrups and they tend to be non-hygroscopic.

Syrups having high maltose contents have previously been produced industrially by the saccharification of starch or starch hydrolysates with malt enzymes. The conversion action of malt enzymes results in the production of a conversion product in which maltose is the most abundant saccharide present. A typical prior art procedure for making a high maltose syrup involves solubilization of starch followed by treatment with malt enzymes to saccharify the solubilized starch so as to obtain a starch hydrolysate having a high maltose content. Suitable enzymes for this saccharification process have been primarily limited to malt enzymes. The saccharification or conversion of the starch hydrolysate has usually been carried out with malt enzymes to a D.E. of between 35 and 55, depending upon the extent of conversion desired. D.E. is the abbreviation for dextrose equivalent and represents the total reducing sugars present expressed as dextrose in terms of percentage, dry basis.

Heretofore the upper limit for economical malt saccharification is usually considered to be about 50 to 55 D.E. Such a conversion liquor will usually contain 60 to 65% maltose. Saccharification to this extent is dependent upon the starch solubilization step employed. If high maltose syrups of greater than 55 D.E. are desired, further saccharification has been accomplished with other saccharifying enzymes such as fungal amylase. Such saccharifying enzymes will form a considerable amount of dextrose from the saccharides present. Such a second saccharification step will usually result in a slight decrease in the total amount of maltose present, but nevertheless, yields syrups of relatively high maltose content which may be sweeter and usually contain a higher amount of fermentables than the conventional malt conversion syrup.

High maltose syrups have become increasingly important in commercial applications. Syrup compositions having a high maltose content furnish desirable, non-hygroscopic properties to hard candies. They are also useful in controlling crystal formation in frozen dessert formulations. Similarly, the high fermentables content of high maltose syrups is of value in the baking and brewing industries. Although malt enzymes have been known and used alone for a long period of time and are expected to retain their importance in industry, it is desirable to find a substitute process for use in place of the malt enzyme process for making high maltose conversion products of starch, that can produce high maltose syrups having equal or better properties than those produced by the malt enzyme process alone.

Accordingly, it is an object of the present invention to provide a novel process for producing high maltose starch conversion products in place of the prior art processes in which malt enzymes alone were used.

Another object of the present invention is to provide a novel process for the production of high maltose syrups having improved non-crystallizing characteristics.

A further object of the invention is to provide a practical process for the production of high maltose syrups that is based on the use of maltogenic enzymes in combination with a pullulanase enzyme preparation.

Yet another object of the invention is to provide a novel process for the practical production of high maltose syrups that is readily susceptible to scientific improvements to permit the development of operating economy.

Another object of the present invention is to provide a novel process for the production of high maltose syrups having substantially non-crystallizing characteristics and non-hygroscopic characteristics.

Another object of the invention is the production of high maltose syrups of higher maltose and fermentables content than those produced heretofore.

It is another object of the present invention to provide a practical process for the production of high maltose starch conversion products that are useful in the production of food products such as, for example, frozen desserts that do not exhibit crystal formation under low temperature conditions.

Other objects of the present invention will be apparent hereinafter from the following description and from the recitals of the appended claims. All parts and percentages mentioned hereafter are by weight, dry basis, unless expressly stated to be otherwise.

The present invention provides a process for the preparation of a high maltose-containing starch conversion product which comprises subjecting partially hydrolyzed starch, having a D.E. not exceeding about 20, to conversion with a maltogenic enzyme preparation and a pullulanase enzyme preparation to obtain a conversion product having a D.E. of at least about 45, a maltose content of at least about 50%, and yeast fermentables content of at least about 80%. This conversion product can be concentrated and refined if desired, to produce a non-crystallizing high maltose syrup. This syrup can be used to produce syrup solids of high maltose content by concentration and drying of the high maltose syrup to a moisture content less than about 15%.

Maltogenic enzymes are widespread in nature. Good sources for these enzymes include malted grains such as barley, sorghum and wheat, for example. Other sources include microorganisms, for example, maltogenic enzymes may be obtained by submerged culture fermentation of the strains of the bacterium *Bacillus polymyxa*.

The enzyme, pullulanase, also designated dextrin alpha 1-6 glucosidase is elaborated during the submerged culture fermentation by strains of the bacterium, *Aerobacter aerogenes*.

The process of the invention will now be described in detail.

PARTIAL HYDROLYSIS OF STARCH

The partially hydrolyzed starch that is used as the starting material in the present invention is obtained by acid hydrolysis or enzyme hydrolysis of any conventional starch. Suitable starches include cereal starches such as corn, grain, sorghum and wheat; waxy starches such as waxy milo and waxy maize; and root starches such as potato starch and tapioca starch. Crude starch sources may also be used, such as ground cereals, macerated tubers or the partially purified starches therefrom.

Prior to hydrolysis, the starch is solubilized by gelatinization. Gelatinization is carried out by heating the starch to a temperaure exceeding about 60° C. in the presence of moisture.

Acid hydrolysis of starch is carried out in a conventional manner to a D.E. not exceeding about 20, preferably to a D.E. between about 10 and about 20.

Enzyme hydrolysis of starch is carried out using suitable liquefying enzymes to attain a D.E. not exceeding about 20, preferably between about 5 and about 20.

The term "partially hydrolyzed starch" as used hereafter refers to the acid or enzyme treated solubilized starch having a D.E. less than about 20.

PREPARATION OF ENZYME

The maltogenic enzyme used in the present invention are well-known and their prepartion is well-known.

The debranching enzyme, pullulanse, used in the process of this invention, is produced by members of the bacterial species *Aerobacter aerogenes* when suitably incubated under conditions of aerobic culture. Characteristics by which members of the species *Aerobacter aerogenes* may be distinguished are described by M. W. Yale, R. S. Breed, et al., in "Bergey's Manual of Determinative Bacteriology," seventh edition, pp. 341–42, 1958 (Williams and Wilkins Co., Baltimore), although it is well recognized by those skilled in the science, that mutant strains may be isolated from time to time which do not completely conform to this identical description.

The method of producing the enzyme pullulanase is described by Hans Bender and Kurt Wallenfels in an article entitled "Specific Decomposition by a Bacterial Enzyme." The article appeared in "Biochemische Zeitschrift," 334, 79–95 (1961).

The source of the *Aerobacter aerogenes* culture exemplified in the present disclosure was the American Type Culture Collection, 12301 Parklawn Drive, Rockville, Maryland. The designation of the culture was *Enterobacter aerogenes* ATCC 8724. One method of obtaining the enzyme from the culture is as follows:

A medium containing
0.8% Difco Bacto-peptone
0.5% maltose,
0.3% sodium nitrate,
0.05% dibasic potassium phosphate
0.05% potassium chloride 0.001% ferrous sulfate heptahydrate with a pH adjusted to 7.2 is dispensed into 1,000 milliliter Erlenmeyer flasks, 200 milliliters per flask. The flasks are stoppered with cotton plugs and sterilized.

The culture inoculum is obtained by aseptically transferring from a agar slant, cells of a pure culture of the microorganism *Aerobacter aerogenes* ATCC 8724, into a sterilized flask with the above medium. The flask is then placed on a reciprocal shaker in a constant temperature room operated at 29° C. The flask is shaken for 6 hours after which time the culture has grown abundantly and is ready to be used to inoculate flasks of the above defined medium. 10 millilitere are aseptically transferred to each of the enzyme production flasks. These flasks are then placed on a reciprocal shaker in a constant temperature room operated at 29° C. They are shaken for a period of time from 66 to 72 hours. At the end of the fermentation the flasks are removed from the shaker, their contents pooled and the cells therein removed from the culture liquor by centrifugation. The supernatant liquor is then adjusted to pH 6.2 and preserved by the addition of toluene. An aliquote of the supernatant liquor is then assayed for enzyme activity. The amount of pullulanase enzyme produced may vary from about 0.05 to 0.15 units per milliliter.

A concentrated dried preparation of the pullulanase enzyme may be obtained by the following procedure:

1500 milliliters of chilled (4° C.) acetone is added to 1 liter of chilled (4° C.) cell free culture liquor containing 10 grams of diatomaceous earth. After complete mixing the suspension is vacuum filtered to recover the insolubilized enzyme. Upon completion of filtration, the filter cake is recovered, spread, and allowed to dry overnight at room temperature. Once the filter cake is dried it is assayed for pullulanase enzyme activity. Preparations obtained by this procedure will have an activity from 3 to 10 units per gram, depending on the activity of the culture liquor used and the efficiency of recovery.

The level of pullulanase enzyme activity present in pullulanase preparations may be determined as follows:

An aliquot of enzyme solution is adjusted to pH 5.5, and 1.0 milliliter is added to a digestion mixture composed of 2 milliliters of a 5% pullulan solution and 7 milliliters of a M/50 phosphate buffer, pH 5.5. The reaction is carried out in test tubes placed in a 40° C. waterbath and is allowed to proceed for 1 hour. At the end of the digestion period, the reaction is stopped by the addition of hydrochloric acid to lower the pH to 3.0. The reducing sugar content of the digestion mixture is determined, as well as that of the culture liquor and pullulan used, by a modification of the alkaline potassium ferricyanide method described hereinafter and is expressed as microgram equivalents of dextrose. Pullulanase enzyme activity is calculated as follows:

$$A = \frac{T-(C+P)}{180 \times 60} \times D$$

where

A=Pullulanase enzyme activity, units per milliliter or gram of enzyme preparation.
T=Total reducing sugars in digestion mixture in micrograms.
C=Residual reducing sugars in culture liquor in micrograms.
P=Reducing value of the pullulan polysaccharide used in the digestion mixture in micrograms.
D=Dilution factor of enzyme preparation.
180=Reducing value of 1 micromole of dextrose.
60=Time (minutes) of reaction.

One unit of pullulanase is defined as the amount of enzyme required to produce 180 micrograms of reducing sugars, calculated as dextrose, per minute from pullulan under the conditions specified above. The polysaccharide, pullulan, which is a polymer of maltotriose units connected to each other by alpha 1–6 linkages, may be obtained from *Pullularia pullulans* ATCC 9348 by use of the procedure of S. Ueda, K. Fujita, K. Komatsu, and Z. Nakashima which appear in "Applied Microbiology 11, 211–215 (1963)." The modified potassium ferricyanide assay procedure used for determination of reducing agents in assaying enzyme preparations is conducted as follows:

Reagents

Alkaline ferricyanide: Dissolve 1.170 g. of potassium ferricyanide and 19.5 g. of anhydrous sodium carbonate in water and dilute to 1 liter. Store in amber bottle. Standard dextrose solution, 0.1 mg./ml.: Weigh 1,000 g. of pure anhydrous dextrose and dilute to 100 ml. Using a class A pipette, transfer 10.0 ml. of the solution to a 1 liter flask and dilute to mark.

Procedure

Standardization: Pipette 0.5-, 1.0-, 1.5-, 2.0-, and 2.5-ml. aliquots of standard dextrose solution, 0.1 mg./ml. into respective 18-cm. test tubes. Then water is added in amounts to bring the total volume of the respective tubes to 2.5 ml. The reagent blank contains 2.5 ml. of water. To each tube is then added 5 ml. of the alkaline ferricyanide solution. The mixture is then heated in a boiling waterbath for exactly 5 minutes, cooled immediately in a tap-waterbath, diluted to 12.5 ml. volume with water and mixed. Using water as reference solution at 0 adsorbance, determine the absorbancy of the blank and of each of the standard tubes at 373 mµ on a Beckman DU spectrophotometer, using 1-cm. cuvettes.

Analysis

An aliquot of enzyme preparation is used which will produce from 1 to 10 mg. reducing sugars per 10 ml. digestion mixture. The sample of the digestion mixture assayed by this method will contain from 50 to 250 micrograms of reducing sugar.

Calculation

Plot absorbances of standard tubes corrected for blank versus micrograms of dextrose per 12.5 ml. on linear coordinate graph for standardization curve.

CONVERSION OF PARTIALLY HYDROLYZED STARCH

In the commercial production of high maltose syrups, it is common for the conversions to be performed at relatively high dry substance levels, usually within the range of about 15 to about 40% to reduce tank size requirements and evaporation costs, and at relatively high temperatures such as for example, about 50° C. to about 60° C. in order to retard or prevent microbial spoilage of the conversion liquors. Many enzymes are inhibited at high substrate concentrations and at high temperatures such as those mentioned above. Surprisingly, however, pullulanase prepared in accordance with the above, is quite amenable for use under the conditions required for successful and economical industrial operations for the production of high maltose conversion products from starch.

The preferred process for the combined use of a maltogenic enzyme and pullulanase includes operation within the substrate conditions and conversion temperature ranges mentioned above, although the enzymes may be used to convert higher or lower substrate concentrations anywhere within the temperature range of about 30° C. to 70° C., if desired. The conversions may be performed within the pH range of about 4.5 to 8.0, the preferred range being 5.0 to 6.5. The time required for conversion of partially hydrolyzed starch to a high maltose starch conversion product will depend upon the enzyme dosage employed and the extent of conversion desired. However, desirable high maltose starch conversion products can be produced conveniently at reasonable enzyme dosages with 24 to 48 hour conversion periods.

The conversion of the partially hydrolyzed starch may be effected with the simultaneous use of the maltogenic enzyme and the pullulanase, or the pullulanase may be applied first or after application of the maltogenic enzyme. As will be shown in the following examples, the preferred process is simultaneous application of the maltogenic enzyme and the pullulanase.

The starch conversion products may be concentrated and/or refined to produce high maltose syrups. These syrups are substantially non-crystallizing, and exhibit non-hygroscopic properties. In order to obtain these syrups, the starch conversion products are concentrated to a solids content in excess of 50%. The products may be refined by conventional methods such as carbon refining, ion exchange treatment, and the like, to obtain syrups that are substantially non-crystallizing and have maltose contents between about 50% and about 90%, dry basis.

In the following operating examples which illustrate the invention, all percentages are by weight, dry basis, and all temperatures are in degrees centigrade.

EXAMPLE 1

Production of high maltose conversion products

This example illustrates the simultaneous use of a maltogenic enzyme and pullulanase in the preparation of high maltose starch conversion products from partially enzyme-hydrolyzed starch. This example also illustrates varied dosages of pullulanase and malt diastase in combinations to produce the high maltose, high fermentables conversion products.

A 30% by weight suspension of corn starch was enzymatically liquefied at 91° C., pH 5.5, using HT–1000 (a bacterial alpha amylase preparation produced and sold by Miles Chemical Company) at a dosage of 0.05% on a dry basis. The enzyme liquefying action was stopped by heating the liquefied starch to 121° C. for 15 minutes when the partially hydrolyzed starch reached a D.E. between 2 and 5. The partially hydrolyzed starch was cooled to 55° C. and the pH adjusted to 5.8. The partially hydrolyzed starch was then dosed with the respective levels of pullulanase and maltogenic enzymes shown in Table I. Table I also sets forth the D.E. values obtained, and the carbohydrate compositions after both 24 and 48 hours of conversion.

TABLE I.—COMPOSITION OF THE CONVERSION LIQUORS

| Pullulanase dosage, u./100 g.D.S. | Malt diastase dosage [a], U/100 g.D.S. | D.E. | Dextrose (percent D.B.) | Maltose (percent D.B.) | Maltotriose (Percent D.B.) | DP$_4$ and Higher (percent D.B.) | Fermentables [b] (Percent D.B.) |
|---|---|---|---|---|---|---|---|
| 24-HOURS | | | | | | | |
| 0 | 25 | 42.3 | 0.6 | 60.0 | 11.8 | 27.6 | 72.4 |
| 0 | 50 | 45.5 | 2.7 | 61.5 | 11.9 | 23.9 | 76.1 |
| 0 | 100 | 47.3 | 3.2 | 63.5 | 12.3 | 21.0 | 79.0 |
| 0 | 200 | 49.4 | 3.6 | 66.5 | 12.0 | 17.9 | 82.1 |
| 50 | 25 | 48.6 | 0.9 | 70.0 | 13.7 | 15.4 | 84.6 |
| 50 | 50 | 49.9 | 2.9 | 70.4 | 13.6 | 13.1 | 86.9 |
| 50 | 100 | 51.7 | 3.5 | 71.9 | 14.6 | 10.0 | 90.0 |
| 50 | 200 | 52.5 | 2.7 | 73.4 | 14.2 | 9.7 | 90.3 |
| 100 | 25 | 49.7 | 1.7 | 71.5 | 15.5 | 11.3 | 88.7 |
| 100 | 50 | 51.4 | 1.4 | 72.8 | 16.3 | 9.5 | 90.5 |
| 100 | 100 | 52.2 | 2.5 | 72.2 | 16.6 | 8.7 | 91.3 |
| 100 | 200 | 53.4 | 4.2 | 73.4 | 15.0 | 7.4 | 92.6 |
| 200 | 25 | 50.5 | 0.5 | 74.0 | 15.9 | 9.6 | 90.4 |
| 200 | 50 | 51.5 | 2.3 | 72.4 | 16.4 | 8.9 | 91.1 |
| 200 | 100 | 52.5 | 1.6 | 76.0 | 15.3 | 7.1 | 92.9 |
| 200 | 200 | 53.6 | 1.6 | 76.4 | 16.4 | 5.6 | 94.4 |
| 28-HOURS | | | | | | | |
| 0 | 25 | 43.5 | 1.9 | 61.6 | 9.8 | 26.7 | 73.3 |
| 0 | 50 | 47.6 | 3.3 | 64.5 | 11.6 | 20.6 | 79.4 |
| 0 | 100 | 51.1 | 4.0 | 67.0 | 12.5 | 16.5 | 83.5 |
| 0 | 200 | 51.9 | 3.8 | 71.1 | 11.7 | 13.5 | 86.5 |
| 50 | 25 | 51.5 | 4.1 | 72.0 | 14.4 | 9.5 | 90.5 |
| 50 | 50 | 52.8 | 2.4 | 75.0 | 14.8 | 7.8 | 92.2 |
| 50 | 100 | 54.7 | 3.4 | 75.0 | 15.2 | 6.4 | 93.6 |
| 50 | 200 | 56.2 | 4.5 | 75.5 | 14.0 | 6.0 | 94.0 |
| 100 | 25 | 52.9 | 1.5 | 75.4 | 15.9 | 7.2 | 92.8 |
| 100 | 50 | 54.3 | 1.9 | 76.5 | 16.0 | 5.6 | 94.4 |
| 100 | 100 | 54.2 | 2.8 | 77.2 | 14.6 | 5.4 | 94.6 |
| 100 | 200 | 55.7 | 3.5 | 77.6 | 13.8 | 5.1 | 94.9 |
| 200 | 25 | 52.7 | 1.2 | 76.0 | 15.9 | 6.9 | 93.1 |
| 200 | 50 | 52.4 | 1.5 | 76.5 | 16.0 | 6.0 | 94.0 |
| 200 | 100 | 54.3 | 2.4 | 77.0 | 15.3 | 5.3 | 94.7 |
| 200 | 200 | 54.9 | 3.7 | 77.6 | 13.8 | 4.9 | 95.1 |

[a] Forty units of malt diastase is equivalent to 1% distillers barley malt having a Lintner Value of 200-220° L.
[b] Dextrose, maltose, and maltotriose.

Table II below is a rearrangement of a portion of the data of the preceding table demonstrating the reduced requirement or the quantity of maltogenic enzyme to reach a given D.E. when pullulanase enzyme is used in addition to the malt enzyme in the production of high maltose, high fermentable conversion products.

TABLE II.—COMPARATIVE D.E. VALUES OF CONVERSION LIQUORS

| Pullulanase dosage (u./100 g.D.S.) | Malt diastase dosage (u./100 g.D.S.) | D.E. 24 hours | D.E. 48 hours |
|---|---|---|---|
| 0 | 25 | 42.3 | 43.5 |
| 0 | 50 | 45.5 | 47.6 |
| 0 | 100 | 47.3 | 51.1 |
| 0 | 200 | 49.4 | 51.9 |
| 0 | 25 | 42.3 | 43.5 |
| 50 | 25 | 48.6 | 51.5 |
| 100 | 25 | 49.7 | 52.9 |
| 200 | 25 | 50.5 | 52.8 |

Table III sets forth the composition of representative hydrolysate liquors, and demonstrates that reduced dosages of the maltogenic enzymes produced higher maltose, high fermentable syrups when used in conjunction with the pullulanase enzyme as compared to higher levels of maltogenic enzyme alone. The results also show that at a given D.E. value, higher maltose levels are attainable through the use of pullulanase-maltogenic enzyme combinations than are attainable by maltogenic enzymes alone.

TABLE III.—COMPOSITION OF THE HYDROLYZATE LIQUORS

| Pullulanase dosage, u./100 g.D.S. | Malt diastase dosage, u./100 g.D.S. | D.E. | Dextrose (percent D.B.) | Maltose (percent D.B.) | Maltotriose (percent D.B.) | DP$_4$ and higher (percent D.B.) | Fermentables (percent D.B.) |
|---|---|---|---|---|---|---|---|
| 24-HOURS | | | | | | | |
| 0 | 50 | 45.5 | 2.7 | 61.5 | 11.9 | 23.9 | 76.1 |
| 0 | 100 | 47.3 | 3.2 | 63.5 | 12.3 | 21.0 | 79.0 |
| 0 | 200 | 49.4 | 3.6 | 66.5 | 12.0 | 17.9 | 82.1 |
| 0 | 25 | 42.3 | 0.6 | 60.0 | 11.8 | 27.6 | 72.4 |
| 50 | 25 | 48.6 | 0.9 | 70.0 | 13.7 | 15.4 | 84.6 |
| 100 | 25 | 49.7 | 1.7 | 71.5 | 15.5 | 11.3 | 88.7 |
| 200 | 25 | 50.5 | 0.5 | 74.0 | 15.9 | 9.6 | 90.4 |
| 48-HOURS | | | | | | | |
| 0 | 50 | 47.6 | 3.3 | 64.5 | 11.6 | 20.6 | 79.4 |
| 0 | 100 | 51.1 | 4.0 | 67.0 | 12.5 | 16.5 | 83.5 |
| 0 | 200 | 51.9 | 3.8 | 71.1 | 11.7 | 13.5 | 86.5 |
| 0 | 25 | 43.5 | 1.9 | 61.6 | 9.8 | 26.7 | 73.3 |
| 50 | 25 | 51.5 | 4.1 | 72.0 | 14.4 | 9.5 | 90.5 |
| 100 | 25 | 52.9 | 1.5 | 75.4 | 15.9 | 7.2 | 92.8 |
| 200 | 25 | 52.8 | 1.2 | 76.0 | 15.9 | 6.9 | 93.1 |

EXAMPLE 2

Production of high maltose conversion products from partially enzyme hydrolyzed waxy milo starch This example illustrates the enhancing effect of pullulanasa when used with malt diastase in the conversion of waxy starches to high maltose, high fermentable conversion products.

Waxy milo starch was enzymatically liquefied to 5 D.E. as outlined in Example 1, cooled to 50° C., adjusted to pH 5.7 and dosed with pullulanase and malt diastase enzymes simultaneously as shown in Table IV. Table IV also sets forth the analyses of the conversion liquors after 46 and 70 hours of conversion.

TABLE IV.—COMPOSITION OF CONVERSION LIQUORS

| Pullulanase dosage, u./100 g.D.S. | Malt diastase dosage, u./100 g.D.S. | D.E. | Dextrose (percent D.B.) | Maltose (percent D.B.) | Maltotriose (percent D.B.) | $DP_4$ and higher (percent D.B.) | Fermentables (percent D.B.) |
|---|---|---|---|---|---|---|---|
| 46-HOURS ||||||||
| 0   | 20 | 38.3 | 2.75 | 54.5 | 8.35  | 35.4 | 64.6 |
| 100 | 20 | 47.6 | 3.4  | 73.0 | 16.9  | 6.4  | 93.6 |
| 200 | 20 | 48.9 | 1.3  | 73.5 | 16.3  | 7.6  | 92.4 |
| 0   | 80 | 44.7 | 4.1  | 60.5 | 10.3  | 25.1 | 74.9 |
| 100 | 80 | 51.4 | 3.2  | 73.0 | 16.7  | 7.1  | 92.9 |
| 200 | 80 | 51.9 | 3.1  | 75.5 | 19.3  | 2.1  | 97.9 |
| 70-HOURS ||||||||
| 0   | 20 | 39.5 | 1.6  | 53.5 | 10.7  | 34.2 | 65.8 |
| 100 | 20 | 49.6 | 2.6  | 74.7 | 12.5  | 11.2 | 88.8 |
| 200 | 20 | 51.0 | 1.4  | 75.0 | 18.0  | 5.6  | 94.4 |
| 0   | 80 | 47.2 | 4.4  | 64.0 | 10.4  | 21.2 | 78.8 |
| 100 | 80 | 53.4 | 3.7  | 74.0 | 15.0  | 7.3  | 92.7 |
| 200 | 80 | 53.0 | 2.4  | 78.5 | 16.7  | 1.4  | 98.6 |

As illustrated in Example 1, the enhancing effect elicited by pullulanase when used in conjunction with the maltogenic enzymes is again evident.

EXAMPLE 3

Production of high maltose conversion products from corn starch maltogenic enzymes from sources other than malts This example illustrates the enhancing effect of pullulanase in the production of high maltose, high fermentable conversion products by the simultaneous application of pullulanase and maltogenic enzymes other than those derived from malt, such as for example, Bacillus polymyxa.

An example of a suitable maltogenic enzyme is the microbiological enzyme that is produced by the bacterium Bacillus polymyxa. It may be prepared from B. polymyxa ATCC 8523 and the activity of the resulting enzyme preparation determined by the following procedure.

Preparation of enzyme

The enzyme preparation identified as Bacillus polymyxa amylase is prepared by growing Bacillus polymyxa on appropriate media by submerged culture, stationary culture, or surface culture techniques at temperatures of from 20° C. to 40° C., for about 24 to 144 hours. A satisfactory medium will contain suitable amounts of organic or inorganic nitrogen sources such as, for example, corn steep liquor, yeast extract, dry yeast, beef extract, peptone, cottonseed or soybean meal and inorganic ammonium salts; carbon sources such as starch, modified starch, starch hydrolysates, and the like; and inorganic salts.

One method of producing the enzyme is described as follows. Cells from a slant culture of B. polymyxa ATCC 8523 were inoculated into a 500 ml. Erlenmeyer flask containing a sterile medium, composed of 4.0 grams ground yellow corn, 0.4 gram yeast extract, 0.5 gram calcium carbonate, and distilled water to 100 ml. The inoculated flask was incubated for 48 hours at 32° C. on a rotary shaker. A 10 ml. portion of the culture from this flask was aseptically introduced into a 1000 ml. Erlenmeyer flask containing sterile production medium composed of 6.0 grams peptone, 1.0 gram yeast extract, 1.0 gram beef extract, 16 grams potato starch, 0.2 gram dipotassium phosphate and distilled water to 200 ml. The pH was adjusted to 7.2. The production flasks were incubated at 32° C. on a rotary shaker while the enzyme was produced and excreted into the culture medium. After 7 days fermentation, the contents of the flasks were filtered and the maltogenic enzyme, present in an amount equivalent to 0.2 units per ml. as defined below, was recovered in the filtrate. This enzyme was then used in the filtrate form for the conversion of starch hydrolysates to high maltose products.

The level of enzyme activity present in B. polymyxa fermentation broths or enzyme concentrations was determined as follows. The enzyme substrate consisted of a 10% solution in water of a 15–18 D.E. spray-dried acid hydrolysate of corn starch. Exactly 50 ml. of the solution was pipetted into a 100 ml. volumetric flask. To the flask was added 5.0 ml. of a 1.0 molar, pH 6.5 phosphate buffer. The flask was then placed in a 40° C. water bath. After 10 minutes, an amount of enzyme containing 0.2 to 0.4 units of activity, as defined hereafter, was added to the flask. At exactly 60 minutes after the enzyme addition, the reaction was stopped by adjusting the solution to a phenophthalein end point with one molar sodium hydroxide. The solution was then cooled to room temperature and diluted to volume. The reducing sugar value, calculated as dextrose, was determined on the diluted sample and on a control with no enzyme added. Maltogenic enzyme activity was calculated as follows.

$$A = \frac{S-B}{E}$$

wherein:

A = Maltogenic enzyme activity, units per ml. of enzyme preparation
S = Reducing sugars in enzyme converted sample in grams per 100 ml.
B = Reducing sugars in control in grams per 100 ml.
E = Amount of enzyme preparation used, ml.

The Bacillus polymyxa amylase prepared in accordance with the above was used to convert a 30% dry substance dispersion of corn starch in water which had been partially hydrolyzed by enzyme according to the procedure in Example 1. The conversions were performed at 60° C. at a pH of 6.2, using the enzyme levels shown in Table V.

As with the maltogenic enzymes of plant origin, higher maltose, higher fermentables compositions are attainable with a combination of pullulanase and a microbiological maltogenic enzyme than with the microbiological maltogenic enzyme alone. Similarly, at a given D.E. value, higher maltose levels are attainable with a combination of pullulanase and maltogenic enzyme than with maltogenic enzymes alone, and the amounts of maltogenic enzyme required to reach a given D.E. is substantially reduced when the maltogenic enzyme is used in combination with pullulanase.

ciency as well as convenience to add both the maltogenic and the pullulanase enzymes simultaneously to convert the partially hydrolyzed starch to high maltose compositions, the beneficial effect of pullulanase may be obtained even when this enzyme is added prior to the maltogenic enzyme addition. This is illustrated in this example.

A 30% suspension of white milo starch was enzyme liquefied following the procedure described in Example TABLE V.—D.E. AND COMPOSITION OF HYDROLYZATE LIQUORS OBTAINED BY USE OF B. POLYMYXA MALTOGENIC ENZYMES AND PULLULANASE

| Pullulanase dosage, u./100 g.D.S. | B. polymyxa enzyme dosage, u./100 g.D.S. | Time of hydrolysis (hr.) | D.E. | Dextrose (percent D.B.) | Maltose (percent D.B.) | Maltotriose (percent D.B.) | $DP_4$ and higher (percent D.B.) | Fermentables (percent D.B.) |
|---|---|---|---|---|---|---|---|---|
| 0 | 12 | 24 | 43.5 | 0.0 | 62.2 | 10.8 | 27.0 | 73 |
| 0 | 12 | 72 | 46.2 | 1.6 | 63.4 | 11.7 | 23.3 | 76.7 |
| 50 | 12 | 24 | 46.6 | 0.0 | 67.4 | 14.0 | 18.6 | 81.4 |
| 50 | 12 | 72 | 52.2 | 0.4 | 74.9 | 16.2 | 8.5 | 91.5 |
| 100 | 12 | 24 | 48.4 | 0.7 | 69.4 | 14.8 | 15.1 | 84.9 |
| 100 | 12 | 72 | 53.0 | 1.6 | 76.4 | 13.7 | 8.3 | 91.7 |
| 0 | 25 | 24 | 46.0 | 0.0 | 64.1 | 9.3 | 26.6 | 73.4 |
| 0 | 25 | 72 | 50.0 | 3.6 | 69.6 | 6.9 | 19.9 | 80.1 |
| 50 | 25 | 24 | 50.7 | 1.7 | 70.0 | 12.9 | 15.4 | 84.6 |
| 50 | 25 | 72 | 54.1 | 5.7 | 71.3 | 14.4 | 8.6 | 91.4 |
| 100 | 25 | 24 | 51.5 | 2.4 | 72.0 | 14.7 | 10.9 | 89.1 |
| 100 | 25 | 72 | 55.3 | 2.9 | 76.4 | 13.5 | 7.2 | 92.8 |
| 0 | 50 | 24 | 50.9 | 3.9 | 66.1 | 8.6 | 21.4 | 78.6 |
| 0 | 50 | 72 | 52.2 | 5.6 | 69.0 | 6.3 | 19.1 | 80.9 |
| 50 | 50 | 24 | 52.8 | 4.3 | 70.9 | 12.1 | 12.7 | 87.3 |
| 50 | 50 | 72 | 56.1 | 5.3 | 75.9 | 9.1 | 9.7 | 90.3 |
| 100 | 50 | 24 | 54.5 | 2.9 | 74.8 | 13.6 | 8.7 | 91.3 |
| 100 | 50 | 72 | 56.7 | 4.8 | 79.5 | 9.3 | 6.4 | 93.6 |
| 0 | 100 | 24 | 52.6 | 6.3 | 69.1 | 4.2 | 20.4 | 79.6 |
| 0 | 100 | 72 | 54.7 | 6.8 | 73.3 | 0.8 | 19.1 | 80.9 |
| 50 | 100 | 24 | 55.2 | 5.8 | 75.9 | 8.7 | 9.6 | 90.4 |
| 50 | 100 | 72 | 58.3 | 9.1 | 76.7 | 5.6 | 8.6 | 91.4 |
| 100 | 100 | 24 | 55.7 | 7.6 | 75.2 | 9.3 | 7.9 | 92.1 |
| 100 | 100 | 72 | 58.5 | 7.2 | 79.4 | 4.9 | 8.5 | 91.5 |

EXAMPLE 4

A 30% by weight solution of 16 D.E. acid hydrolysate of corn starch, prepared by conventional means of acid hydrolysis, was converted at 55° C., pH 6.0, for 72 hours with the amount of pullulanase and malt enzymes shown in the following table. The results of the conversion are also shown.

| Pullulanase dosage (u./100 g. D. S.) | Malt dosage (u./100 g. D. S.) | D. E. | Maltose content (percent D. B.) |
|---|---|---|---|
| None | None | 16.1 | 4.1 |
| None | 25 | 45.7 | 56.6 |
| None | 50 | 47.4 | 55.8 |
| 50 | 25 | 49.6 | 61.5 |
| 50 | 50 | 52.0 | 64.0 |
| 100 | 25 | 51.0 | 67.3 |
| 100 | 50 | 52.4 | 66.6 |

EXAMPLE 5

Successive and simultaneous application of pullulanase and maltogenic enzyme in the production of high maltose conversion products While it is most desirable from the standpoint of efficiency as well as convenience to add both the maltogenic 2, and converted at 55° C. at a pH of 6.0 using the pullulanase and malt enzyme levels shown below in Table VII.

TABLE VII.—EFFECT OF PULLULANASE ADDED TO CONVERSION LIQUOR AT VARIOUS TIMES

| Time of Pullulanase addition | Pullulanase dosage, u./100 g. D. S. | Malt dosage, (u./100 g. D. S.) | Conversion, D.E. | Hydrolyzate composition (percent D.B.) | | | | Fermentables (percent D.B.)[a] |
|---|---|---|---|---|---|---|---|---|
| | | | | $DP_1$ | $DP_2$ | $DP_3$ | $DP_4$ and higher | |
| 24 hours prior to malt | 100 | 25 | 50.2 | 5.1 | 67.2 | 14.0 | 13.7 | 86.3 |
| With malt | 100 | 25 | 53.2 | 2.8 | 72.1 | 17.0 | 8.1 | 91.9 |
| 24 hours after malt | 100 | 25 | 41.1 | 1.6 | 54.8 | 14.2 | 29.4 | 70.6 |
| No pullulanase (control) | 0 | 25 | 35.5 | 2.0 | 50.4 | 9.5 | 38.1 | 61.9 |

[a] Total of $DP_1$, $DP_2$ and $DP_3$.

As can be seen, addition of the two enzyme systems simultaneously produces the most effective hydrolysis, however, the enhancing effect of the pullulanase is exhibited when it is added prior to, simultaneous with, or after the maltogenic enzymes.

Advantages of the invention which may be seen from the above description and examples, include:

(1) Production of conversion products containing higher maltose, higher fermentable compositions obtained by simultaneous application of pullulanase with a maltogenic enzyme in the conversion of a partially hydrolyzed starch.

(2) A more efficient hydrolysis occurring with a resultant reduction in the amount of unconverted starch by the supplementary use of pullulanase enzyme in conjunction with maltogenic enzyme for the production of high maltose starch conversion products from partially hydrolyzed starch.

(3) The requirement for the maltogenic enzyme is substantially lessened when simultaneously used in conjunction with pullulanase to obtain a given D.E. in the conversion of a partially hydrolyzed starch.

(4) Because of more efficient conversion of starch to high maltose, high fermentable compositions, the resultant conversion liquors have less variation and thus better serve as a base composition with which to blend dextrose for edible mixed syrups.

While the invention has been described in connection with specific embodiments thereof, it will be understood that it is capable of further modifications, and this application is intended to cover any variations, uses, or adaptations of the invention following, in general, the principles of the invention set forth, and including such departures from the present disclosure as come within known or customary practice in the art to which the invention pertains and as may be applied to the essential features hereinbefore set forth, and as fall within the scope of the invention and the limits of the appended claims.

We claim:

1. A process for preparing a high maltose containing product which comprises subjecting partially hydrolyzed starch, having a D.E. not exceeding about 20, to conversion with a maltogenic enzyme preparation and a pullulanase enzyme preparation to obtain a conversion product having a D.E. of at lest about 45, and a maltose content of at least about 50%, and yeast fermentables content of at least about 80%.

2. A process in accordance with claim 1 wherein the partially hydrolyzed starch has a solids content between about 15% and about 40%.

3. A process in accordance with claim 1 wherein the conversion with the enzyme is carried out at a temperature in the range of about 50° C. to about 60° C.

4. A process in accordance with claim 1 including the additional step of concentrating the high maltose conversion product to obtain a syrup having a solids content in excess of 50% and wherein maltose represents at least about 50% by weight of the solids therein, dry basis.

5. A process in accordance with claim 1 including the additional step of concentrating the high maltose conversion product to dryness, to produce a solid product.

6. A process in accordance with claim 1 wherein the pullulanase and the maltogenic enzyme are applied to the conversion reaction mixture simultaneously.

7. A process in accordance with claim 1 wherein the pullulanase is applied to the conversion reaction mixture prior to the application of the maltogenic enzyme.

8. A process as in claim 1 wherein the maltogenic enzyme is applied to the conversion reaction mixture prior to the application of the pullulanase enzyme.

9. A process as in claim 1 wherein the maltogenic enzyme is *Bacillus polymyxa* amylase.

10. A process as in claim 1 wherein the maltogenic enzyme is malt diastase.

11. A process for preparing a high maltose containing product which comprises subjecting partially hydrolyzed starch, having a solids content from about 15% to about 40% and a D.E. from about 2 to about 20, to conversion at a temperature from about 50° C. to about 60° C., with a malt diastase preparation and a pullulanase enzyme preparation to obtain a conversion product having a DE of at least about 45, a maltose content from about 50% to about 90%, and yeast fermentables content of at least about 80%.

References Cited

UNITED STATES PATENTS

| | | | |
|---|---|---|---|
| 2,891,869 | 6/1959 | Langlois | 195—31 |
| 3,197,338 | 7/1965 | Hurst et al. | 195—31 |
| 3,067,066 | 12/1962 | Ehrenthal et al. | 195—31 |

OTHER REFERENCES

Abdullah et al. Cereal Chemistry vol. 43 pp. 111–117 (1966).

Biochemische Zeitchrift 341, 433–450 (1965) Wallenfels et al.

White et al. "Principles of Biochemistry" 3rd edit McGraw-Hill Book Co., New York, 1964 pp. 49–52.

Prescott & Dunn "Industrial Microbiology" 3rd edit McGraw-Hill Book Co., New York, 1959 p. 501.

Neufeld & Ginsburg "Methods in Enzymology" vol. 8, Academic Press, New York, 1966, pp. 555–559.

Brown, D. H. et al. "Biochemistry" 4, 486–495 (1965).

LIONEL M. SHAPIRO, Primary Examiner

U.S. Cl. X.R.
195—66; 99—142